(12) United States Patent
Park et al.

(10) Patent No.: US 9,807,260 B2
(45) Date of Patent: Oct. 31, 2017

(54) METHOD AND DEVICE FOR USING CLOUD PRINT SERVICE

(71) Applicant: SAMSUNG ELECTRONICS CO., LTD., Suwon-si, Gyeonggi-do (KR)

(72) Inventors: In-chang Park, Suwon-si (KR); Jeong-hun Kim, Hwaseong-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/173,012

(22) Filed: Jun. 3, 2016

(65) Prior Publication Data

US 2017/0048405 A1 Feb. 16, 2017

(30) Foreign Application Priority Data

Aug. 11, 2015 (KR) .......................... 10-2015-0113373

(51) Int. Cl.
*H04N 1/00* (2006.01)
*H04N 1/32* (2006.01)
*G06F 3/12* (2006.01)

(52) U.S. Cl.
CPC ....... *H04N 1/00244* (2013.01); *G06F 3/1206* (2013.01); *G06F 3/1228* (2013.01); *G06F 3/1247* (2013.01); *G06F 3/1267* (2013.01); *G06F 3/1287* (2013.01); *H04N 1/00344* (2013.01); *H04N 1/32609* (2013.01); *H04N 2201/0094* (2013.01)

(58) Field of Classification Search
USPC ....................................... 358/1.15
See application file for complete search history.

(56) References Cited

U.S. PATENT DOCUMENTS

| 8,885,189 | B2 | 11/2014 | Armstrong |
| 8,953,192 | B2 | 2/2015 | Gutnik et al. |
| 2007/0279670 | A1* | 12/2007 | Hiruma ................. G06F 3/1204 358/1.14 |
| 2013/0194634 | A1* | 8/2013 | Sankaranarasimhan ................. G06F 3/1296 358/1.15 |
| 2014/0078541 | A1 | 3/2014 | Takano |
| 2014/0313541 | A1 | 10/2014 | Venkata Prasad et al. |
| 2015/0015908 | A1* | 1/2015 | Tanaka ............... G06K 15/4095 358/1.14 |

FOREIGN PATENT DOCUMENTS

| JP | 2008-46753 | 2/2008 |
| KR | 10-2014-0079397 | 6/2014 |
| KR | 10-2015-0013872 | 2/2015 |

* cited by examiner

*Primary Examiner* — Ngon Nguyen
(74) *Attorney, Agent, or Firm* — Staas & Halsey LLP

(57) ABSTRACT

A method of using a cloud print service includes registering a virtual printer with a server, designating the virtual printer as an output device and transmitting a content file to the server, monitoring the virtual printer and acquiring print data generated by converting the content file from the server, and requesting printing while transmitting the print data to a local printer.

19 Claims, 21 Drawing Sheets

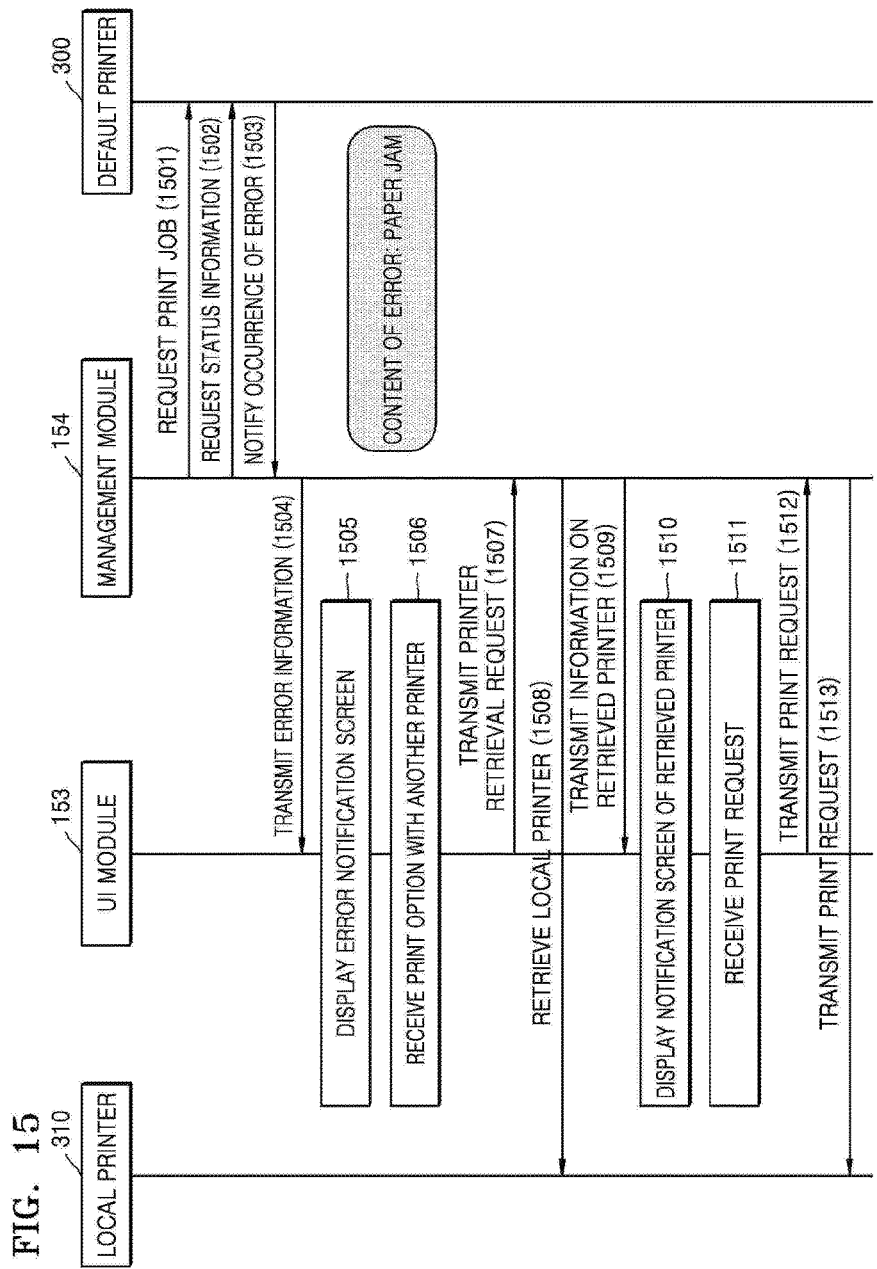

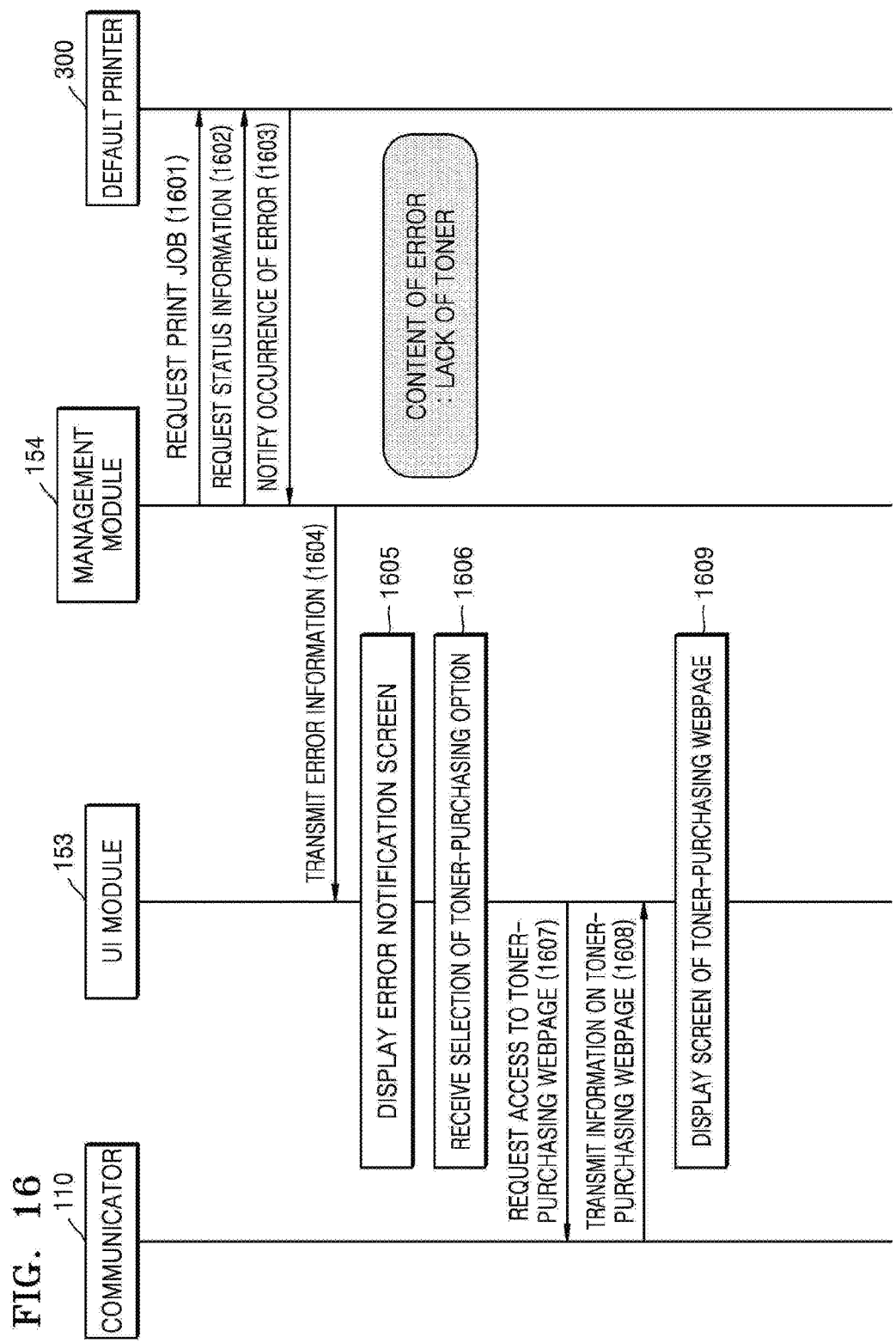

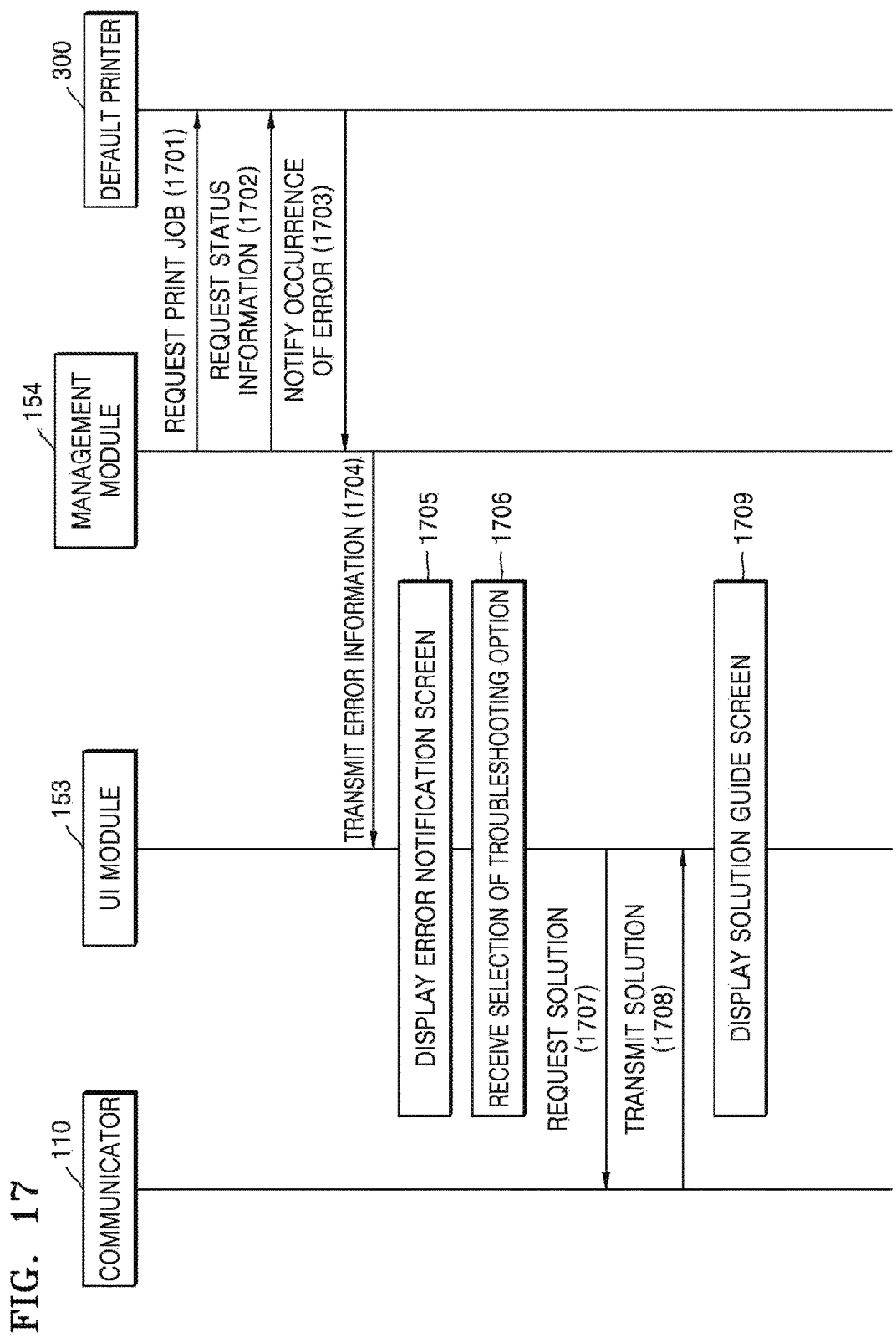

METHOD AND DEVICE FOR USING CLOUD PRINT SERVICE

CROSS-REFERENCE TO RELATED APPLICATIONS

This application claims the priority benefit of Korean Patent Application No. 10-2015-0113373, filed on Aug. 11, 2015, in the Korean Intellectual Property Office, the disclosure of which is incorporated herein in its entirety by reference.

BACKGROUND

1. Field

The present disclosure relates to a method and device for using a cloud print service, and more particularly, to a method of managing a print job when using a cloud print service which does not employ a driver of a device.

2. Description of the Related Art

Recently, a cloud print service which enables efficient use of resources and a reduction in spatial limitations has been widely used.

The cloud print service may be provided in various ways, among which there is a method in which a printer driver of a device is not employed. According to this method, a cloud server receives an original file from a device, renders the original file to generate print data, and then transmits the print data directly to a printer to request printing.

However, according to this method, when a user requests printing through the device and a content file is transmitted to the server, a subsequent process is solely performed by the server, and thus it is difficult to control the print job.

SUMMARY

Provided is a method of managing a print job when using a cloud print service which does not employ a driver of a device.

Additional aspects will be set forth in part in the description which follows and, in part, will be apparent from the description, or may be learned by practice of the presented exemplary embodiments.

According to an aspect of an exemplary embodiment, a method of using a cloud print service includes: registering a virtual printer with a server; designating the virtual printer as an output device and transmitting a content file to the server; monitoring the virtual printer and acquiring print data generated by converting the content file from the server; and requesting printing while transmitting the print data to a local printer.

The requesting of the printing may include: checking print options prestored in the device acquiring the print data; and requesting the printing according to the checked print options.

The local printer may be a default printer corresponding to the virtual printer.

The acquiring of the print data may include: receiving a print job generation event from the server; requesting the print data from the server; and receiving the print data from the server.

The registering of the virtual printer may include: receiving a name of the virtual printer; retrieving at least one local printer; receiving a selection of a default printer corresponding to the virtual printer from among the retrieved at least one local printer; requesting registration of the virtual printer while transmitting the name of the virtual printer to the server; and when a registration-completion response is received from the server, storing the name of the virtual printer and information on the default printer.

The method may further include: receiving status information from the local printer; and displaying the status information on a screen.

The displaying of the status information on the screen may include: analyzing the status information to determine whether an error has occurred in the local printer; and when it is determined that an error has occurred, displaying error information and at least one measure option on the screen.

The method may further include: receiving a selection of any one of the at least one measure option; and performing an operation according to the selected measure option.

When the selected measure option is printing employing another printer, the performing of the operation according to the selected measure option may include: retrieving a printer other than the local printer; and requesting the printing while transmitting the print data to the retrieved printer.

According to another aspect of another exemplary embodiment, a device for using a cloud print service includes: a user interface (UI) configured to display a screen and receive an input from a user; a communicator configured to communicate with a server; a memory configured to store data; and a controller configured to control an operation of the device. When a print request designating a virtual printer as an output printer is received through the UI, the controller transmits a content file to the server through the communicator, monitors the virtual printer to acquire print data generated by converting the content file from the server, and requests printing while transmitting the print data to a local printer.

The controller may check print options prestored in the memory, and request the printing according to the checked print options.

The controller may request the printing from a default printer corresponding to the virtual printer while transmitting the print data to the default printer with reference to the memory.

When a print job generation event is received from the server, the controller may request the print data from the server and receive the print data from the server.

When a name of the virtual printer and a selection of a default printer corresponding to the virtual printer are received through the UI, the controller may request registration of the virtual printer while transmitting the name of the virtual printer to the server, and when a registration-completion response is received from the server, the controller may store the name of the virtual printer and information on the default printer in the memory.

The controller may request and receive status information from the local printer, and display the received status information on the screen through the UI.

The controller may analyze the status information to determine whether an error has occurred in the local printer, and display error information and at least one measure option on the screen through the UI when an error has occurred.

When any one of the at least one measure option is selected, the controller may perform an operation according to the selected measure option.

When the selected measure option is printing employing another printer, the controller may retrieve a printer other than the local printer, and request the printing while transmitting the print data to the retrieved printer.

BRIEF DESCRIPTION OF THE DRAWINGS

These and/or other aspects will become apparent and more readily appreciated from the following description of the exemplary embodiments, taken in conjunction with the accompanying drawings in which:

FIG. 15 is a diagram illustrating a process in which a printer other than a default printer performs printing when an error occurs in the default printer according to an embodiment;

FIG. 16 is a diagram illustrating a process of providing a toner-purchasing option when a printer lacks toner according to an embodiment;

FIG. 17 is a diagram illustrating a process of providing a solution when an error occurs in a printer according to an embodiment;

DETAILED DESCRIPTION

Figure 1:
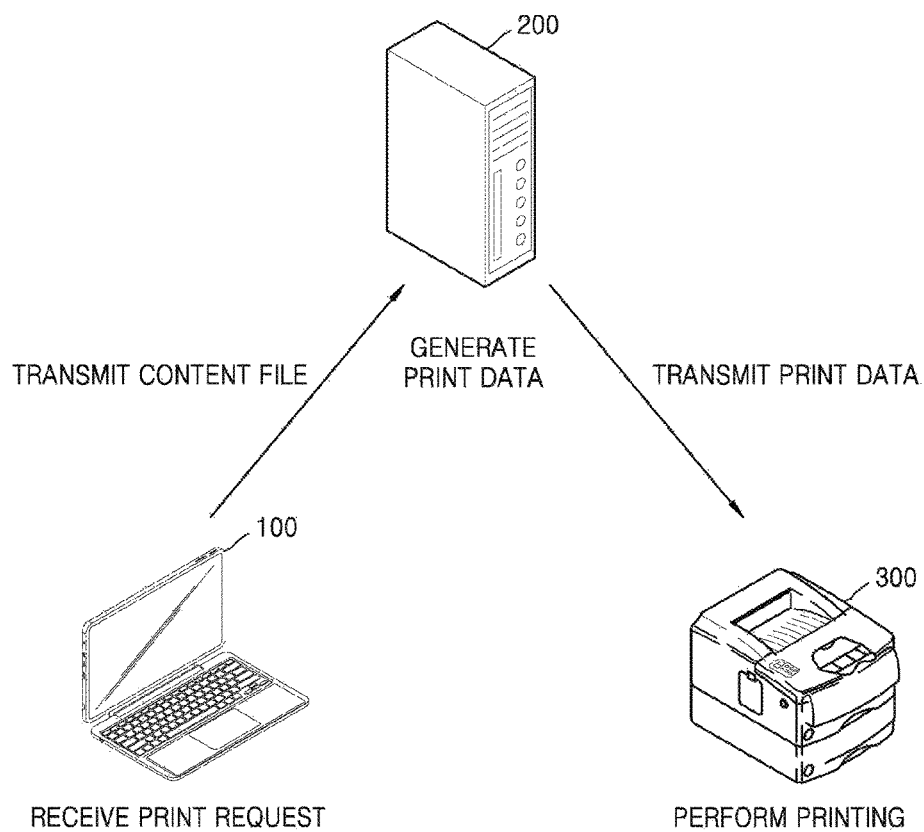
FIG. 1 is a diagram showing an environment of a cloud print service which does not employ a driver of a device.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to describe aspects.

In every embodiment of this specification, a case of using a printer will be described as an example, but it is apparent that it is possible to use not only a printer but also various types of image forming devices, such as a multifunctional apparatus, having a printing function.

FIG. 1 is a diagram showing an environment of a cloud print service which does not employ a driver of a device.

Referring to FIG. 1, a cloud print system includes a device 100, a cloud server 200, and a printer 300. The device 100 may be a variety of devices, such as a PC, a laptop computer, a tablet PC, or a smart phone, which may execute applications (apps) based on an operating system (OS) and support communication with a server.

When a user designates the printer 300 as an output device and requests printing through the device 100, the device 100 requests the printing while transmitting a content file to the cloud server 200. Here, the content file represents any type of file, such as a document, an image, a photo, etc., which may be a target of printing.

It is to be noted that the device 100 transmits the content file to the cloud server 200 as it is without rendering the content file. In other words, in the cloud print service environment shown in FIG. 1, a printer driver installed in the device 100 is not used. Therefore, the device 100 does not render the content file, but the cloud server 200 renders the content file.

The cloud server 200 generates print data by rendering the received original file, that is, the content file. Then, the cloud server 200 requests printing while transmitting the print data to the printer 300, and the printer 300 prints the received print data.

Figure 2:
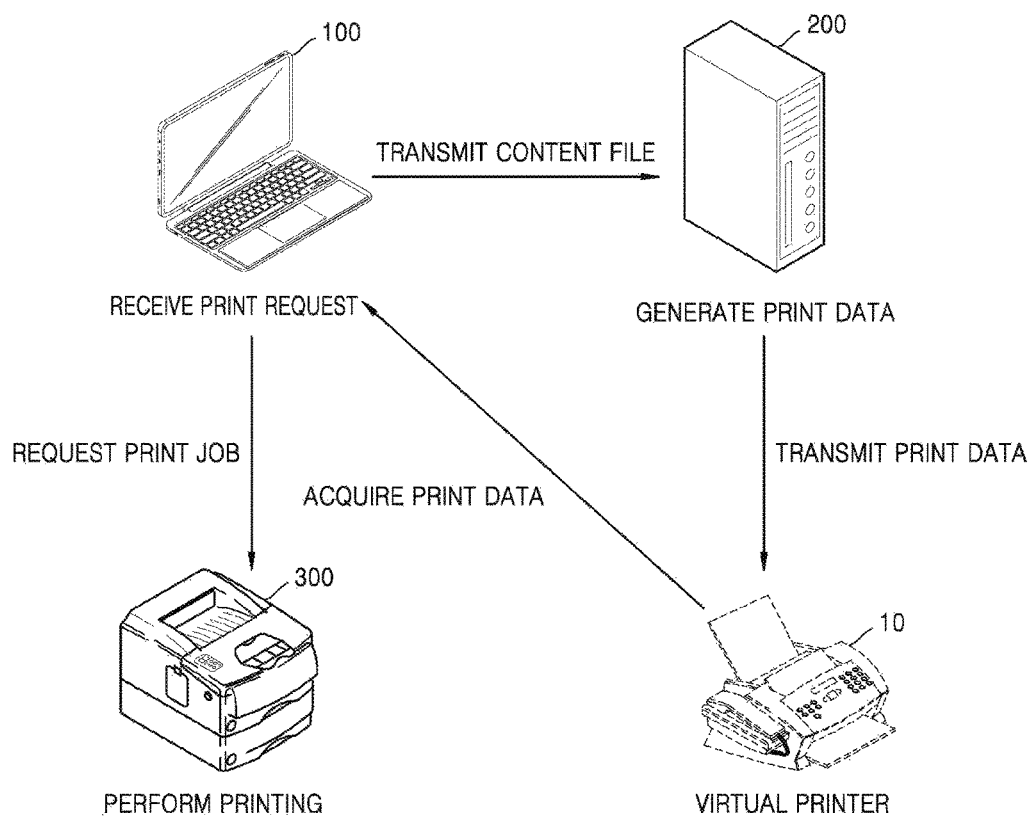
FIG. 2 is a diagram showing an environment in which a cloud print service is used through a virtual printer according to an embodiment.

FIG. 2 is a diagram showing an environment in which a cloud print service is used through a virtual printer according to an embodiment. In the embodiment shown in FIG. 2, a virtual printer 10 is added, compared to FIG. 1. Here, the virtual printer 10 is not a printer which actually exists but a virtual device which is generated to manage a print job and registered with the cloud server 200 by the device 100.

Referring to FIG. 2, when the user designates the virtual printer 10 as an output device and requests printing through the device 100, the device 100 requests the printing while transmitting a content file to the cloud server 200. In this case also, the device 100 transmits the content file to the cloud server 200 as it is without rendering the content file.

The cloud server 200 generates print data by rendering the received original file, and then transmits the print data to the virtual printer 10. When the print data is transmitted to the virtual printer 10, the device 100 may acquire the print data from the virtual printer 10 and request the printing while transmitting the print data to the printer 300.

At this time, since the virtual printer 10 is a nonexistent device, transmission of the print data to the virtual printer 10 may be considered not as actual transmission of the print data to a concrete destination but as transmission of the print data to a virtual space. In other words, it may be appreciated that, when the cloud server 200 transmits the print data to the virtual space, the device 100 acquires the print data from the virtual space. However, in the actual operation, the cloud server 200 may recognize the device 100 as the virtual printer 10 and transmit the print data to the device 100.

Meanwhile, in the embodiment shown in FIG. 2, the cloud server 200 transmits the print data to the virtual printer 10, so that the device 100 may acquire the print data before the print data is transmitted to the printer 300. Therefore, the device 100 may manage the print job, and also request printing from the printer 300 after applying a preset print option to the print job. In addition, the device 100 directly communicates with the printer 300. Therefore, the device 100 may monitor status of a print job performed by the printer 300, and provide a solution to an error to the user when the error occurs.

In this way, using a cloud print service employing the virtual printer 10, it is possible to manage a print job, apply print options set in the device 100 to the print job, and provide an additional service.

Figure 3:
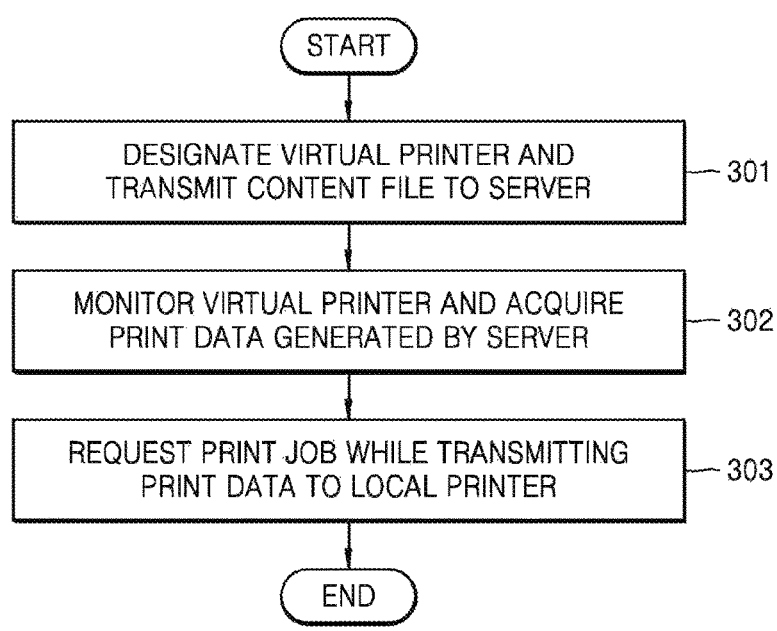
FIG. 3 is a flowchart illustrating a method of using a cloud print service through a virtual printer according to an embodiment.

FIG. 3 is a flowchart illustrating a method of using a cloud print service through a virtual printer according to an embodiment.

Referring to FIG. 3, in operation 301, a device designates a virtual printer as an output device, and transmits a content file to a cloud server. At this time, the virtual printer is a virtual device which is generated and registered with the cloud server in advance by the device. Also, the device transmits the content file to the cloud server as it is without rendering the content file.

In operation 302, the device monitors the virtual printer and acquires print data generated by the cloud server. When the content file is received in operation S301, the cloud server renders the received content file to generate the print data, and transmits the generated print data to the virtual printer. Therefore, the device monitors the virtual printer, and acquires the print data from the virtual printer when it is determined that the print data has been transmitted to the virtual printer. A detailed method in which a device monitors a virtual printer to acquire print data will be described in detail below with reference to FIGS. 10 and 12.

In operation 303, the device requests a print job while transmitting the print data to a local printer. Here, the local printer represents a printer which is connected to the device through wired or wireless communication or an intranet. In other words, the local printer is a printer to which the device may directly transmit a print job instruction. In particular, the device may request the print job from a default printer corresponding to the virtual printer among local printers. Upon generation or registration of the virtual printer, it is possible to set the default printer corresponding to the virtual printer, and the corresponding process will be described in detail below with reference to FIGS. 5 and 6.

Figure 4:
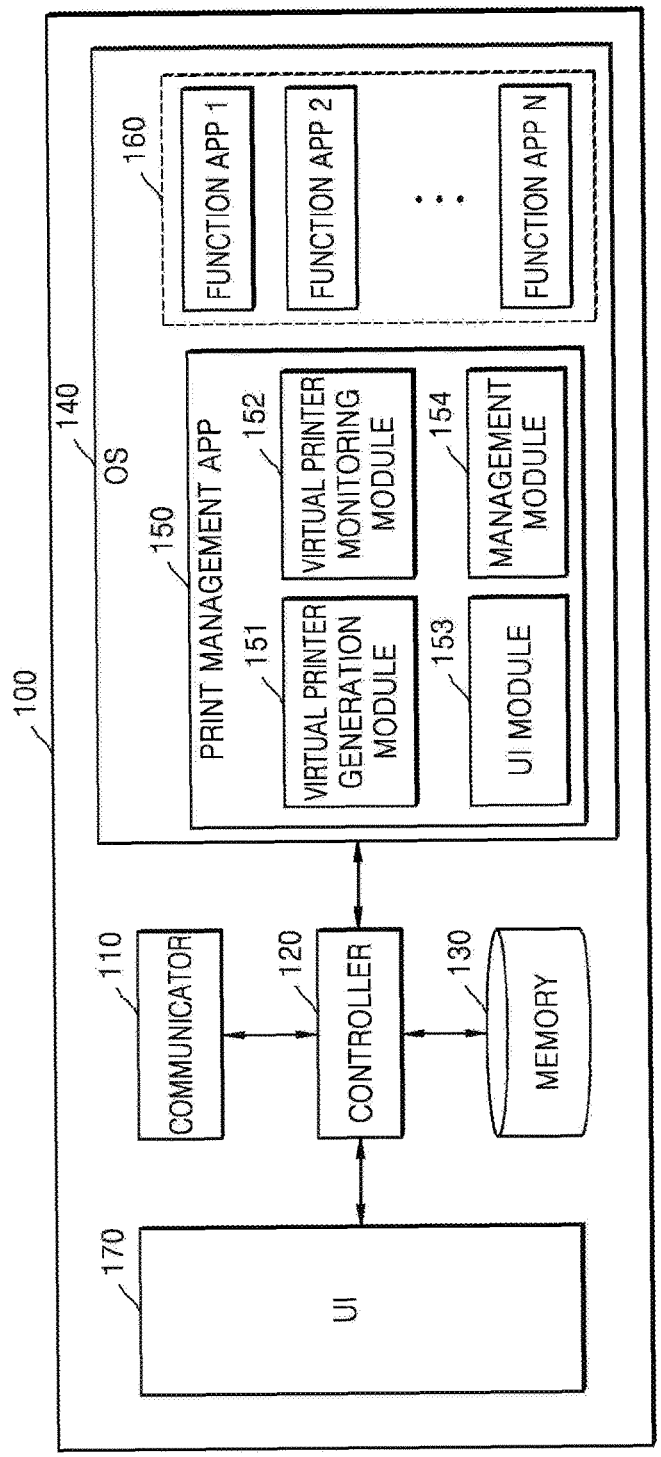
FIG. 4 is a diagram showing a hardware and software configuration of a device according to an embodiment.

FIG. 4 is a diagram showing a hardware and software configuration of a device according to an embodiment. Since FIG. 4 shows only components necessary for descriptions of the following embodiments, it is apparent that additional components may be further included in addition to the shown components.

Referring to FIG. 4, the device 100 according to an embodiment may include a communicator 110, a controller 120, a memory 130, and a user interface (UI) 170 as hardware components, and may include an OS 140 and a print management app 150 and a plurality of function apps 160 installed in the OS 140 as software components.

As for software configurations, the OS 140 is a program which controls hardware of the device 100, provides a basic environment for application software, and enables a user to use a computer. Therefore, the print management app 150 and the plurality of function apps 160 operate based on the OS 140.

The print management app 150 is an app which manages a print job while cloud printing is performed, and may serve to generate and register a virtual printer, acquire print data through monitoring of the virtual printer, apply a preset print option upon a request for the print job, monitor the status of a printer or the print job, provide a solution upon occurrence of an error, and so on. As shown in FIG. 4, the print management app 150 may include a virtual printer generation module 151, a virtual printer monitoring module 152, a UI module 153, and a management module 154, and detailed operations of the respective components will be described below with reference to other drawings.

The plurality of function apps 160 may include function app 1, function app 2, . . . , and function app n. The plurality of function apps 160 include various types of apps for supporting various functions, and a cloud print process may be started when a content print request is received during execution of a function app. In other words, for example, the function app may be an app which supports a function of checking or editing content, such as a document, a photo, an image, or so on. In this case, when the user requests printing while a document or a photo is displayed on a screen through the function app, a cloud print process for printing the document or the photo displayed on the screen is started.

When there is a print request during execution of the function app, the device 100 directly transmits the original file of content to the cloud server 200 without a rendering operation. At this time, the print management app 150 is automatically executed and involved in the cloud print process.

Meanwhile, as for hardware configurations, the communicator 110 is a component which enables wired or wireless communication with the cloud server 200 and the printer 300.

The controller 120 is a component which controls operations of all components of the device 100, corresponding to a central processing unit (CPU), a processor, and so on. When software is executed, the controller 120 performs operations defined in the software, and thus operations of respective software components described below may be considered as being performed by the controller 120, in actuality.

In the memory 130, a variety of information may be stored. In particular, registration information of the virtual printer and information on the preset print option may be stored. The controller 120, that is, the print management app 150 may access the memory 130 to recognize the virtual printer or check the preset print option.

The UI 170 is a component for displaying a screen and receiving an input from the user. A display panel in which a UI screen is displayed, a keyboard or a touch screen for receiving an input of the user, etc. are included in the UI 170.

Detailed operations of the components shown in FIG. 4 will be described in detail with reference to subsequent drawings. Therefore, reference numbers used for the respective components in FIG. 4 will be used in the subsequent drawings as they are.

A method of registering a virtual printer with a cloud server will be described below with reference to FIGS. 5 to 7.

Figure 5:
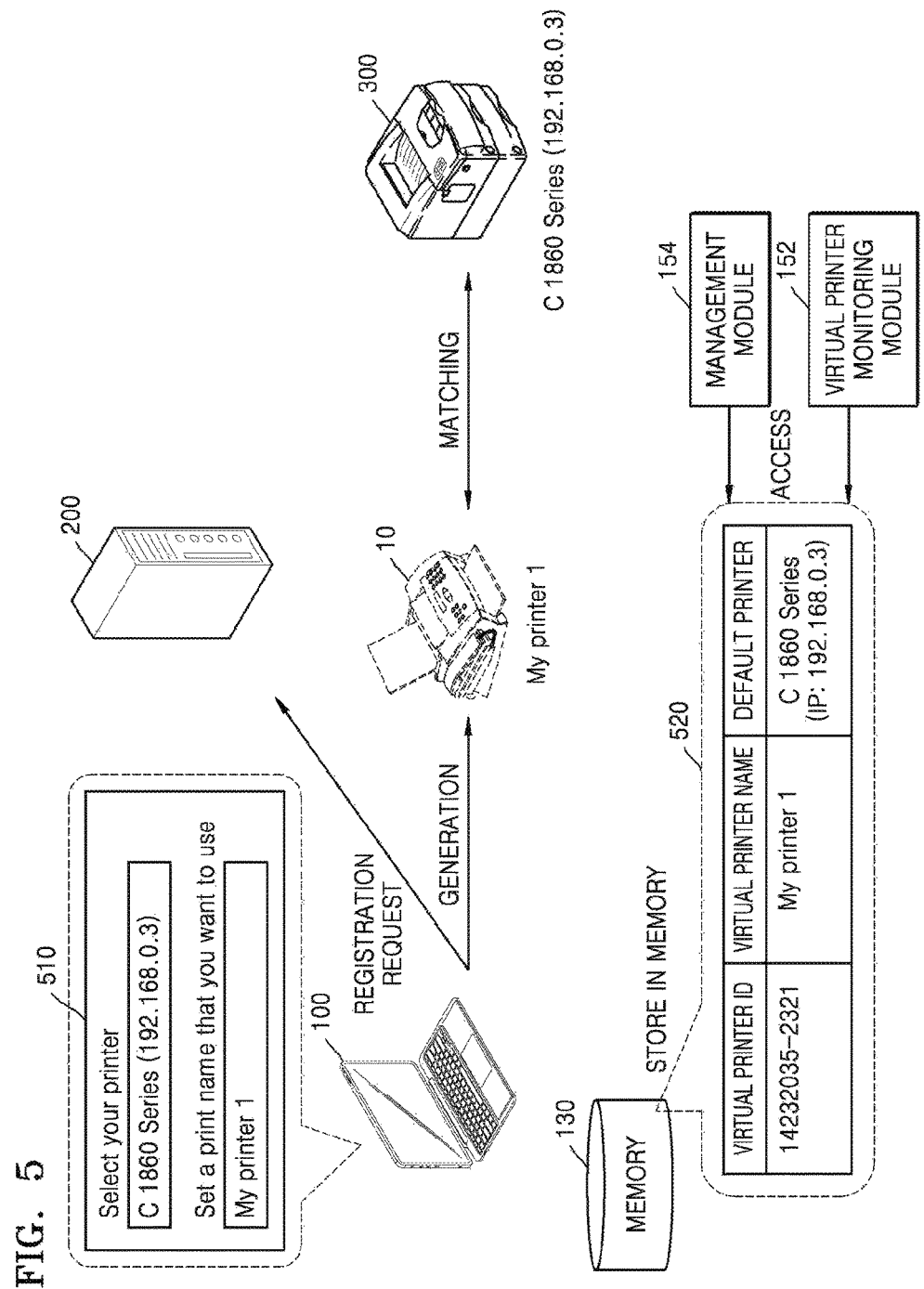
FIG. 5 is a diagram illustrating a method of registering a virtual printer according to an embodiment.

FIG. 5 is a diagram illustrating a method of registering a virtual printer according to an embodiment.

Referring to FIG. 5, when the print management app 150 is executed in the device 100, a UI screen 510 for registering a virtual printer is displayed in the device 100. In the UI screen 510, the user may input a name of a virtual printer and information (e.g., a model name, an Internet protocol (IP) address, etc.) of a default printer corresponding to the virtual printer. Here, the default printer represents a local printer which actually performs a print job when the virtual printer is designated as an output device and requested to perform printing.

In FIG. 5, "My printer 1" is input as the name of the virtual printer, and "C 1860 Series (192.168.0.3)" is input as the information on the default printer. As the information on the default printer, it is also possible to input other information, such as a media access control (MAC) address, etc., for identifying the printer. Further, instead of the user inputting the information of the default printer by himself or herself, the device 100 may retrieve a list of nearby local printers and display a list of the retrieved local printers, and the user may select any one of the local printers included in the list as the default printer.

When the user inputs the name of the virtual printer and the information of the default printer in the UI screen 510 and requests registration, a virtual printer (My printer 1) 10 is generated, and the device 100 transmits a request for registration of the virtual printer 10 to the cloud server 200. The generated virtual printer 10 is matched with the default printer 300.

When the cloud server 200 completes the registration of the virtual printer 10 and transmits a registration-completion response to the device 100, the device 100 stores a virtual printer list 520 in which the name of the virtual printer 10 and the default printer 300 are mapped to a virtual printer identifier (ID) in the memory 130. Here, the virtual printer ID may be generated by the device 100 or the cloud server 200 to identify the virtual printer 10. During a process of performing cloud printing, the management module 154 or the virtual printer monitoring module 152 may access the virtual printer list 520 stored in the memory 130 and use the stored information.

In FIG. 5, the memory 130, the management module 154, and the virtual printer monitoring module 152 which are components included in the device 100 are shown as if they were present outside the device 100 for convenience, but all of them are components included in the device 100 as shown in FIG. 4. This is the same in other subsequent drawings.

Figure 6:
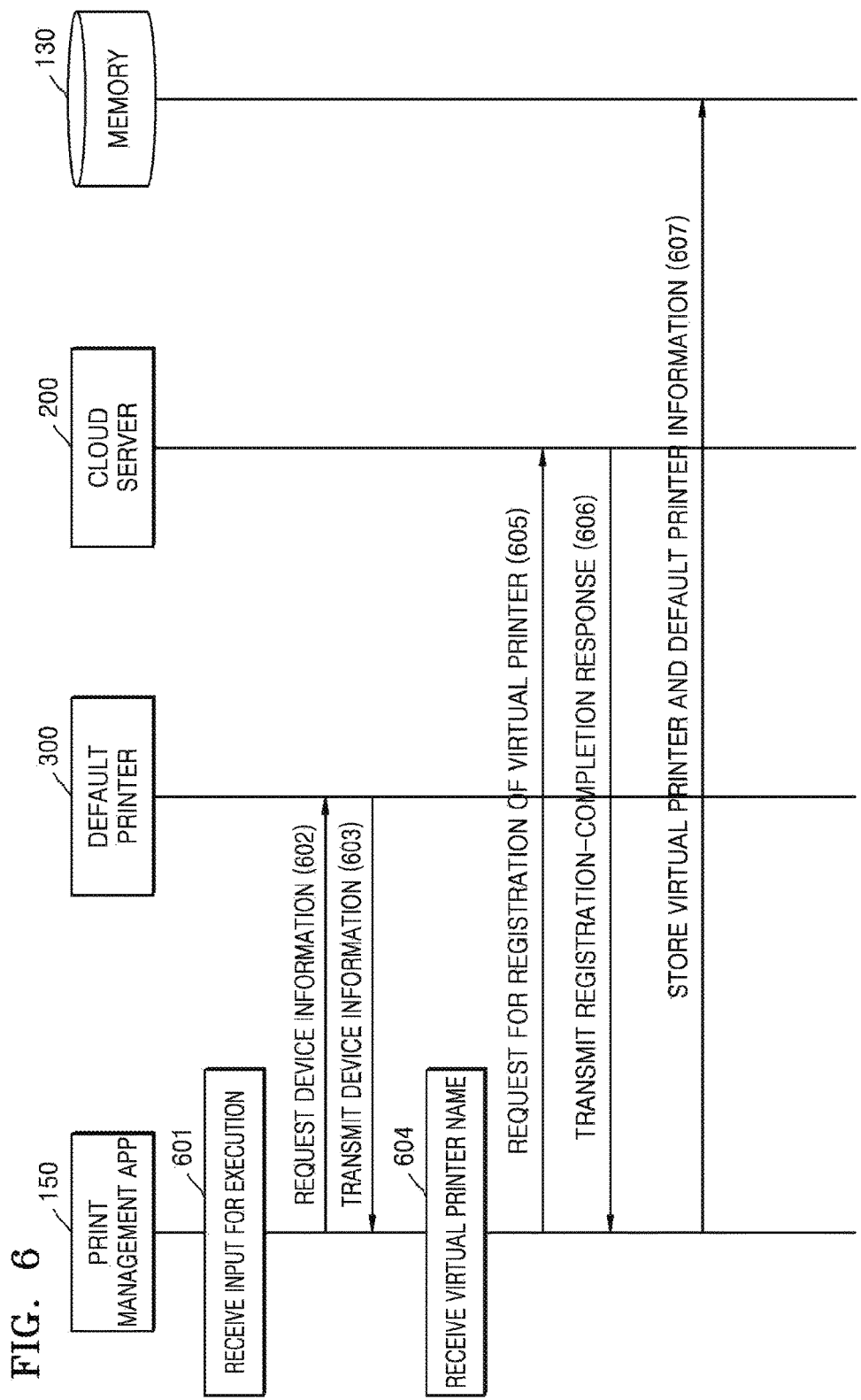
FIG. 6 is a diagram illustrating a process of registering a virtual printer according to an embodiment.

FIG. 6 is a diagram illustrating a process of registering a virtual printer according to an embodiment.

Referring to FIG. 6, in operation 601, an input for executing the print management app 150 is received from the user.

In operation 602, the print management app 150 retrieves a list of the nearby local printer 300, and requests device information from the retrieved local printer 300. The retrieved local printer 300 transmits device information to the print management app 150 in operation 603.

When the print management app 150 receives the device information from the retrieved local printer 300, the print management app 150 displays the device information of the local printer 300 on the screen, and the user may select the retrieved local printer 300 as a default printer.

Also, the print management app 150 displays a UI screen for receiving the name of a virtual printer, and receives the name of a virtual printer from the user in operation 604.

When the name of a virtual printer and the selection of a default printer are received, the print management app 150 transmits a request for registration of the virtual printer to the cloud server 200 in operation 605. The cloud server 200 registers the virtual printer according to the request, and transmits a registration-completion response to the print management app 150 in operation 606.

In operation 607, the print management app 150 stores the name of the virtual printer and information on the default printer in the memory 130.

Figure 7:
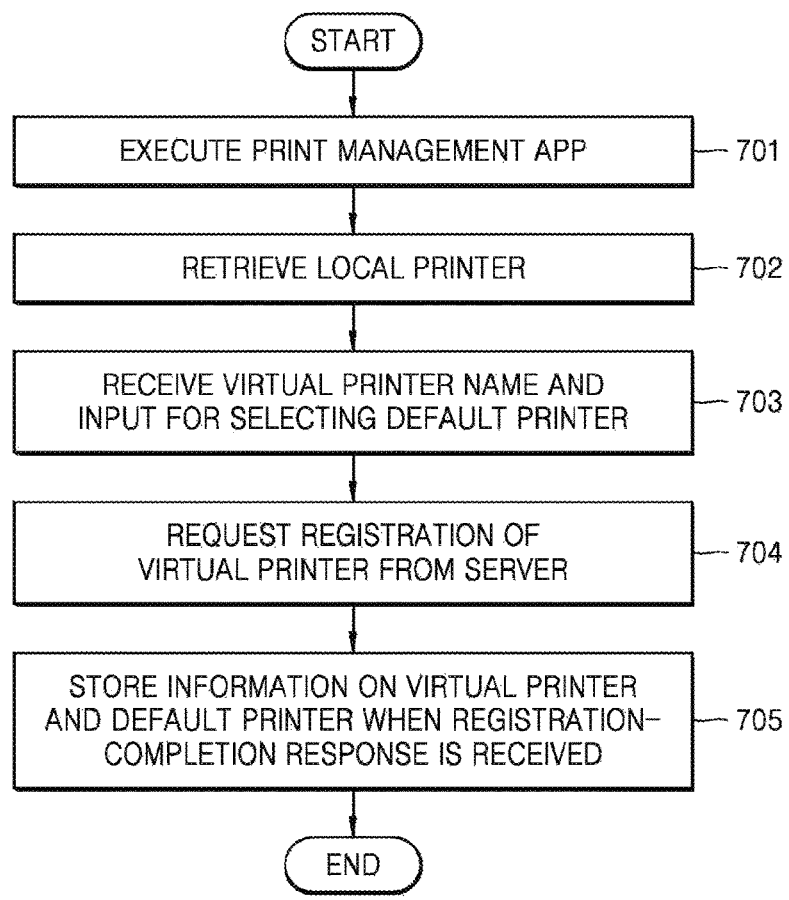
FIG. 7 is a flowchart illustrating a method of registering a virtual printer according to an embodiment.

FIG. 7 is a flowchart illustrating a method of registering a virtual printer according to an embodiment.

Referring to FIG. 7, when a print management app is executed in operation 701, a device retrieves a list of nearby local printers in operation 702.

In operation 703, the device receives the name of a virtual printer and a selection of a default printer. In other words, the device may receive the name of a virtual printer from a user through a UI screen. Also, the device may display a list of retrieved local printers on the UI screen, and receive a selection of any one of the local printers as a default printer from the user.

In operation 704, the device requests registration of the virtual printer from a server. In operation 705, when a registration-completion response for the virtual printer is received from the server, the device stores information on the virtual printer and the default printer in a memory.

A process of performing cloud printing using a virtual printer according to an embodiment will be described below with reference to FIGS. 8 to 13. In particular, a method of performing a print job by applying print options prestored in a device will be described.

Figure 8:
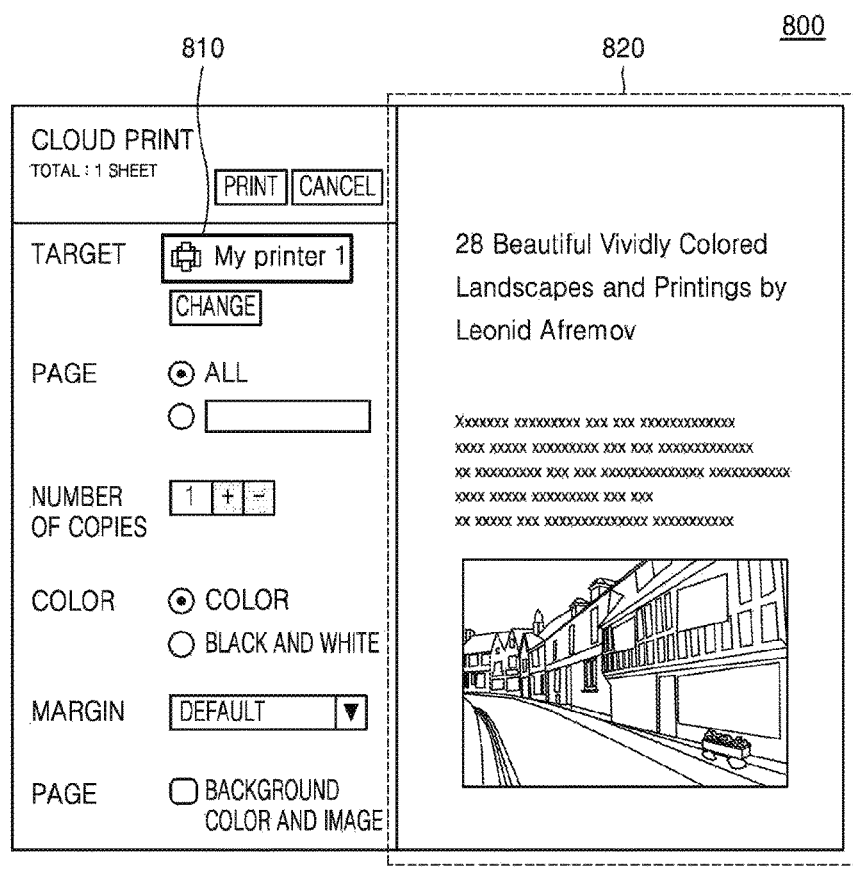
FIG. 8 is a diagram showing a user interface (UI) screen for requesting printing according to an embodiment.

FIG. 8 is a diagram showing a UI screen for requesting printing according to an embodiment.

When printing is requested while the device 100 is displaying content by executing a function app 160, a UI screen 800 for printing currently displayed content is displayed as shown in FIG. 8. In a region 810, a printer designated as an output device is displayed, and a virtual printer (My printer 1) is designated as an output device in FIG. 8. In a region 820, a preview of content to be printed may be displayed.

Figure 9:
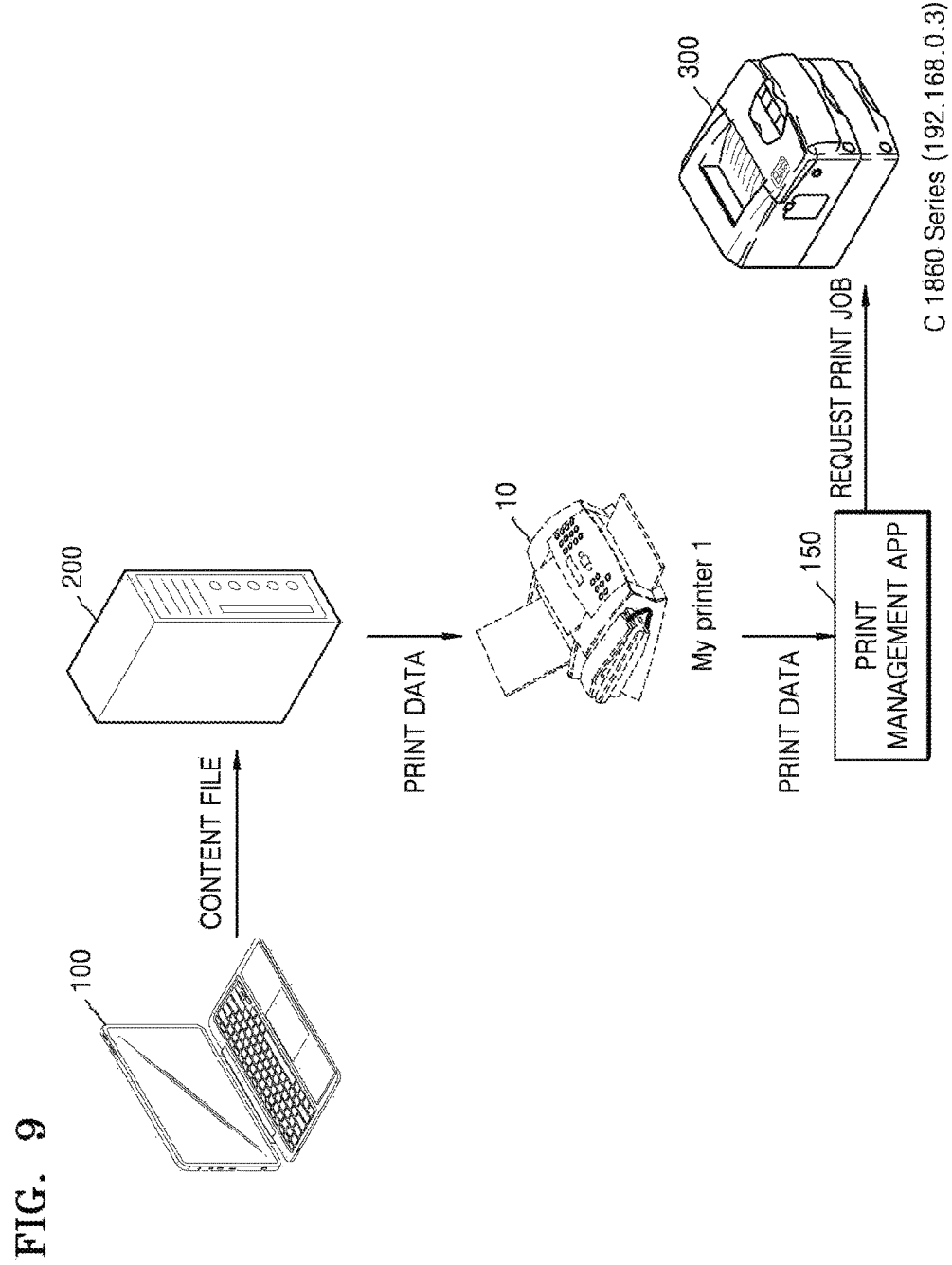
FIGS. 9 and 10 are diagrams illustrating a method of performing cloud printing using a virtual printer according to embodiments.
Figure 10:
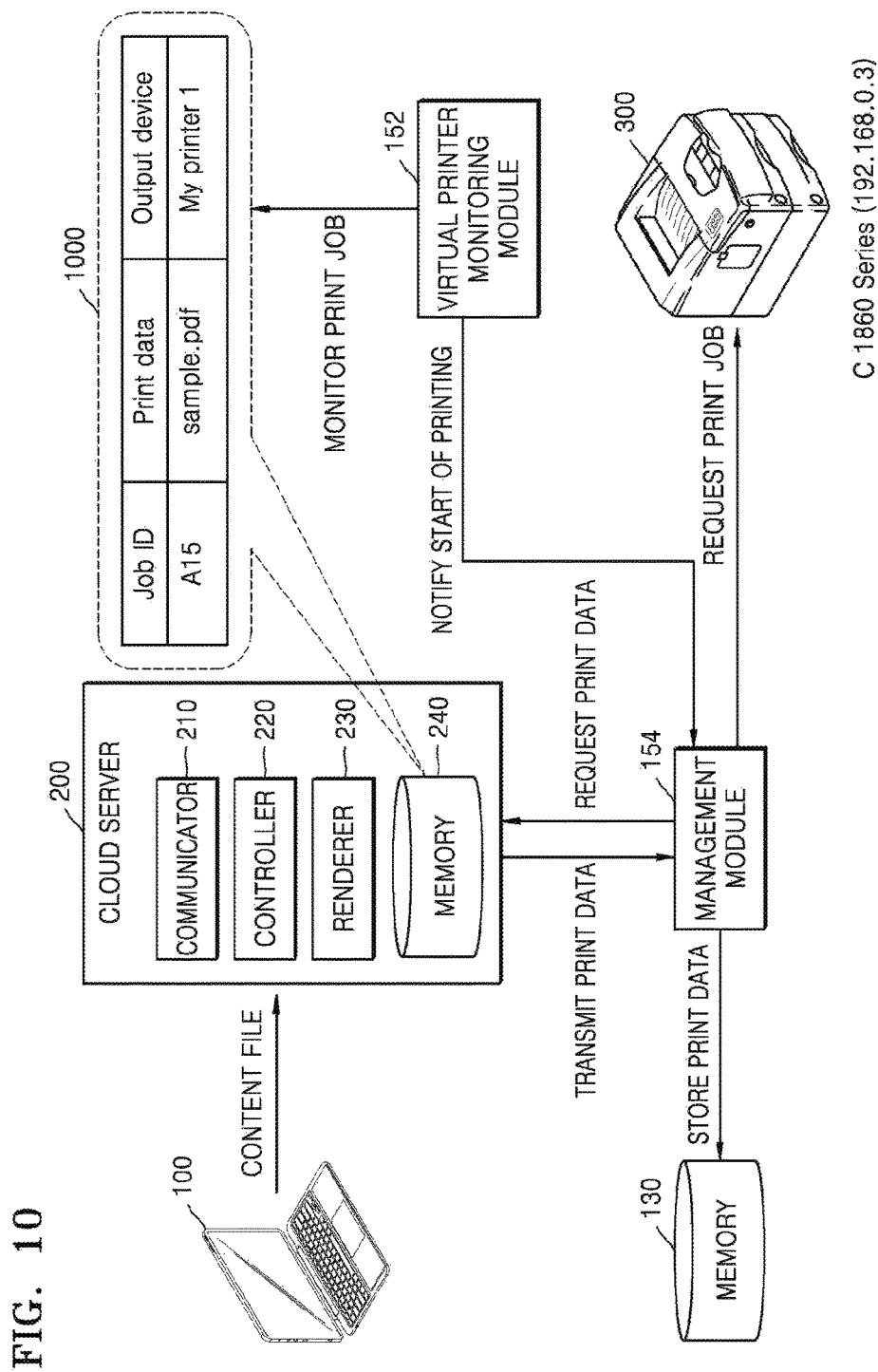

FIGS. 9 and 10 are diagrams illustrating a method of performing cloud printing using a virtual printer according to embodiments. In particular, FIG. 9 conceptually shows a process in which cloud printing is performed through the virtual printer 10, and FIG. 10 shows operations actually performed by respective components in detail.

Referring to FIG. 9, the device 100 designates the virtual printer 10 as an output device, and transmits a content file to the cloud server 200 in its original form. The cloud server 200 generates print data by rendering the received content file, and transmits the generated print data to the virtual printer 10. The virtual printer 10 transmits the received print data to the print management app 150 executed in the device 100. In other words, the print management app 150 monitors the virtual printer 10 to acquire the print data from the virtual printer 10 when a print job is generated.

The print management app 150 requests the print job while transmitting the print data to the default printer 300 corresponding to the virtual printer 10.

However, since the virtual printer 10 is a virtual device which is nonexistent, the virtual printer 10 neither actually receives the print data nor transmits the print data to the print management app 150. Instead, the cloud server 200 may recognize the print management app 150 executed in the device 100 as the virtual printer 10. This will be described in detail with reference to FIG. 10.

Referring to FIG. 10, the device 100 designates a virtual printer as an output device, and transmits a content file to the cloud server 200. The cloud server 200 includes a communicator 210, a controller 220, a renderer 230, and a memory 240. The renderer 230 renders the content file received through the communicator 210, and then generates and stores a print job in the memory 240. These processes are controlled by the controller 220. In FIG. 10, it is possible to see that a print job list 1000 is stored in the memory 240.

When the print job is generated and stored in the memory 240 in this way, the virtual printer monitoring module 152 of the print management app 150 determines that a print job has been generated, and notifies the management module 154 of the start of the print job. Accordingly, the management module 154 requests print data from the cloud server 200, and the cloud server 200 transmits the print data to the management module 154.

The management module 154 receiving the print data requests the print job from the default printer 300 while storing the print data in the memory 130.

Meanwhile, the management module 154 may request the print job from the default printer 300 according to print options preset in the device 100 by the user. This will be described in detail with reference to FIG. 11.

Figure 11:
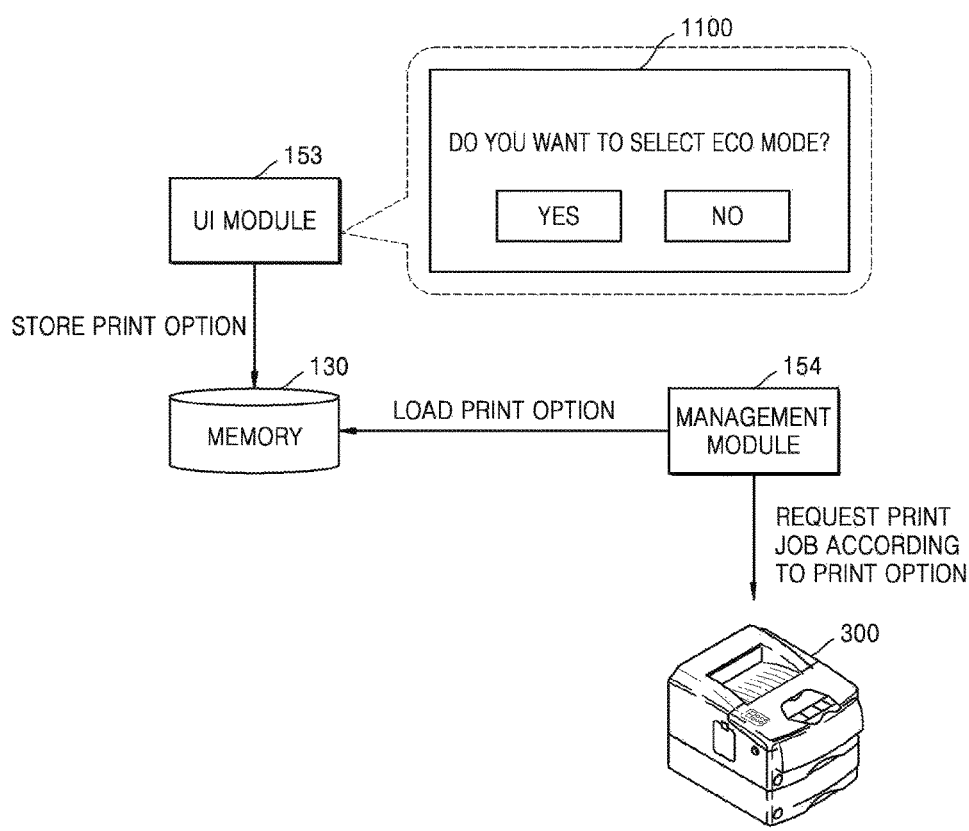
FIG. 11 is a diagram illustrating a method of performing cloud printing by applying print options set in a device according to an embodiment.

FIG. 11 is a diagram illustrating a method of performing cloud printing by applying print options set in a device according to an embodiment.

Referring to FIG. 11, the user may set print options in advance through a UI screen 1100 provided by the UI module 153. In FIG. 11, the UI screen 1100 for selecting an eco mode is shown. When the user sets whether or not to select the eco mode in the UI screen 1100, the UI module 153 stores the set print option in the memory 130. Such setting and storage of print options may be performed in advance before the start of the print job, or may be performed during the print job.

Meanwhile, the eco mode is used as an example of a print option in FIG. 11, but in addition to the eco mode, various settings which may be generally made in a printer driver may be stored as print options. For example, an ID and a password for applying job accounting may be stored in the memory 130 and transmitted to the default printer 300 together with a print job request when a print job is requested. Alternatively, options including mono/color printing, double-sided printing, N-up printing, etc. may be set and stored in advance.

When the print data is acquired from the cloud server 200, the management module 154 accesses the memory 130 to load the stored print option, and requests the default printer 300 to perform the print job according to the print option.

Figure 12:
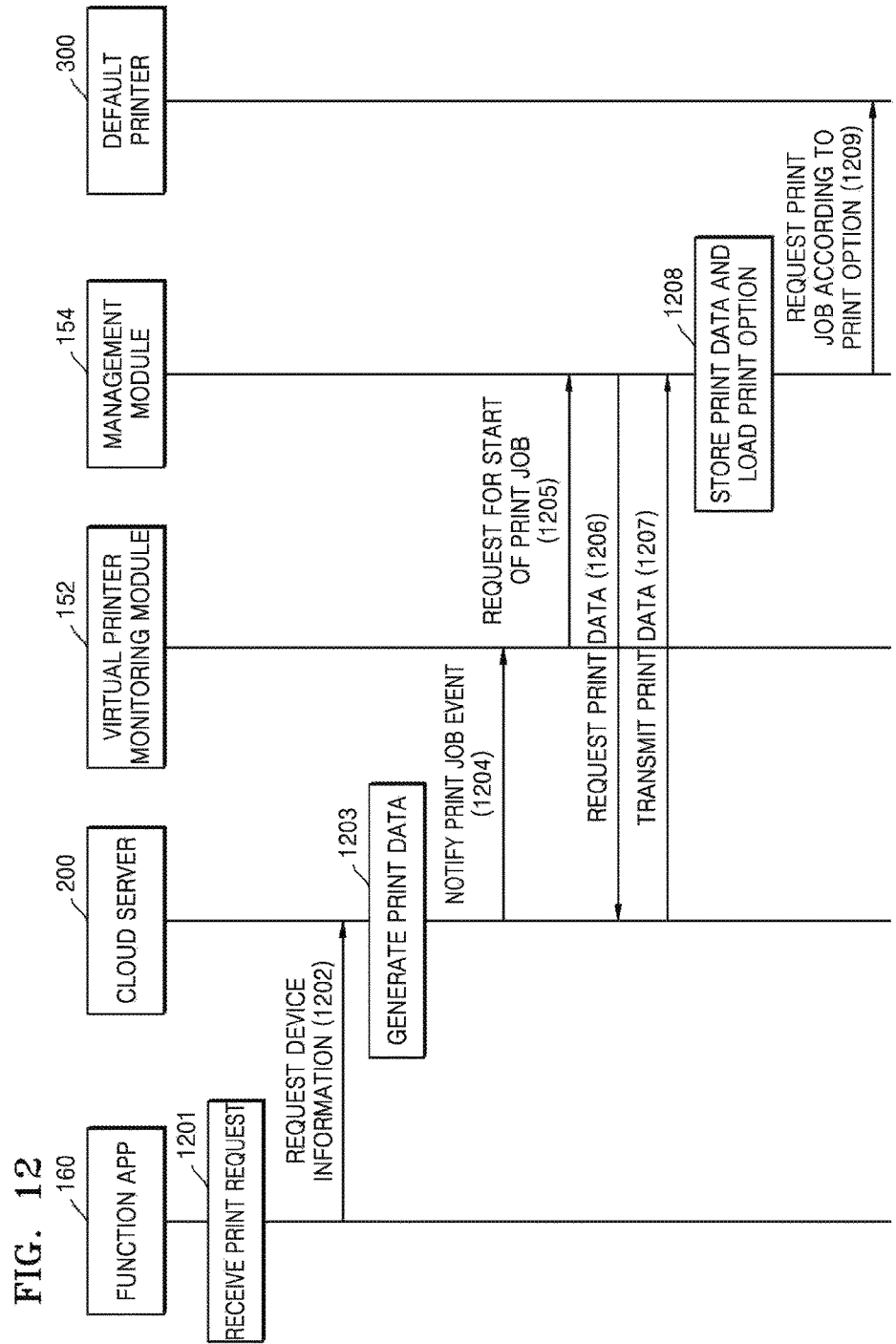
FIG. 12 is a diagram illustrating a process of performing cloud printing by applying print options set in a device according to an embodiment.

FIG. 12 is a diagram illustrating a process of performing cloud printing by applying print options set in a device according to an embodiment.

Referring to FIG. 12, when a content print request is received during execution of a function app 160 in operation 1201, the function app 160 transmits a content file to the cloud server 200 in operation 1202.

In operation 1203, the cloud server 200 generates print data by rendering the received content file, and stores the print data in a memory in the cloud server 200 as a new print job. Subsequently, in operation 1204, the cloud server 200 transmits a notification of a print job event to the virtual printer monitoring module 152.

In operation 1205, the virtual printer monitoring module 152 transmits a request for the start of the print job to the management module 154, and the management module 154 receiving the request requests print data from the cloud server 200 in operation 1206, and receives the print data in operation 1207.

In operation 1208, the management module 154 stores the received print data in the memory 130 in the device 100, and loads print options stored in the memory 130.

In operation 1209, the management module 154 requests a print job from the default printer 300 according to the print options.

Figure 13:
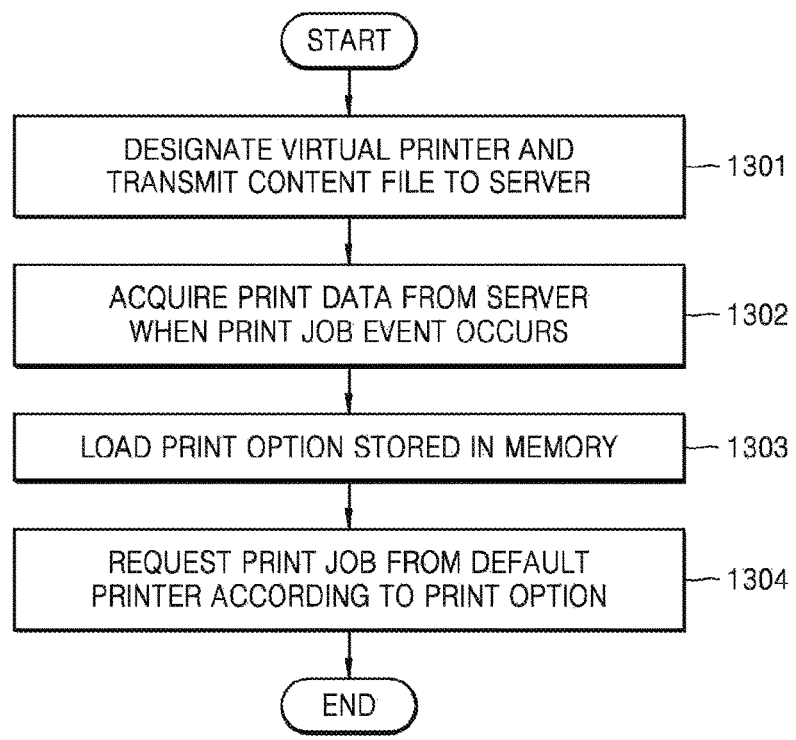
FIG. 13 is a flowchart illustrating a method of performing cloud printing by applying print options set in a device according to an embodiment.

FIG. 13 is a flowchart illustrating a method of performing cloud printing by applying print options set in a device according to an embodiment.

Referring to FIG. 13, in operation 1301, a device designates a virtual printer as an output device, and transmits a content file to a cloud server. Here, the virtual printer is a virtual device which is generated and registered with the cloud server in advance by the device. Also, the device transmits the content file to the cloud server as is.

In operation 1302, when a print job event occurs in the cloud server, the device acquires print data from the cloud server. In detail, the cloud server renders the content file to generate the print data, and transmits a notification of the print job event to the device. When the notification of the print job event is received, the device requests print data from the cloud server and receives the print data.

In operation 1303, the device loads print options stored in a memory. In the memory of the device, print options preset by a user may be stored. Here, the stored print options may include various settings, such as a setting of whether or not to select the eco mode, an ID and a password for applying job accounting, etc., which may be made in a general printer driver.

In operation 1304, the device requests the print job from a default printer according to the print option. In other words, the device requests the print job so that the print option loaded from the memory is applied. For example, when the print option is a setting of the eco mode, the device requests the default printer to perform printing in the eco mode. Alternatively, when the print option is application of job accounting, the device requests the default printer to apply job accounting while transmitting the ID and the password stored in the memory together with the print data. Here, the default printer is a local printer designated to correspond to the virtual printer.

Meanwhile, after requesting a print job from the default printer 300, the print management app 150 may receive status information from the default printer 300 and provide the status information to the user in real time. A method in which the print management app 150 provides status information of the default printer 300 and provides a alternative option upon occurrence of an error will be described below with reference to FIG. 14A to FIG. 18.

Figure 14A:
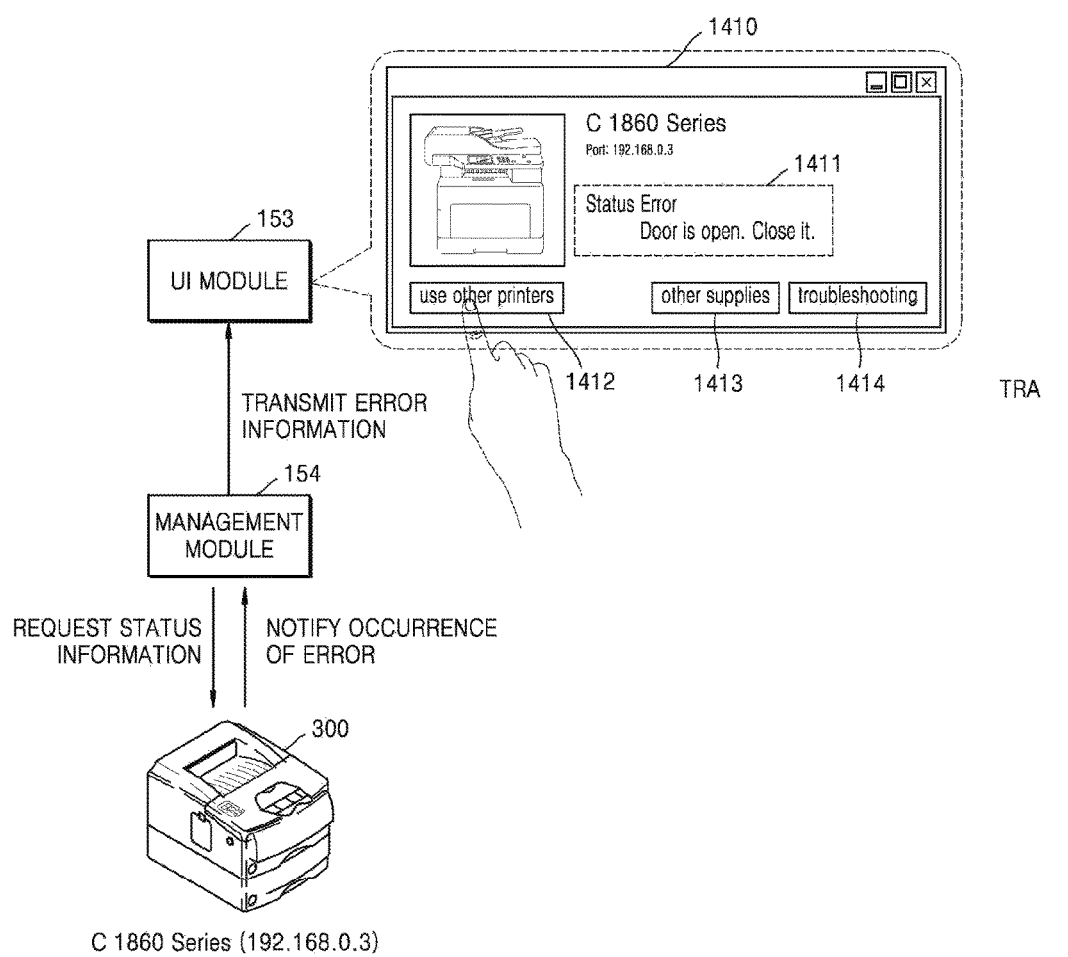
FIGS. 14A and 14B are diagrams illustrating a method of performing printing using a printer other than a local printer which is performing a print job when an error occurs in the local printer according to an embodiment.
Figure 14B:
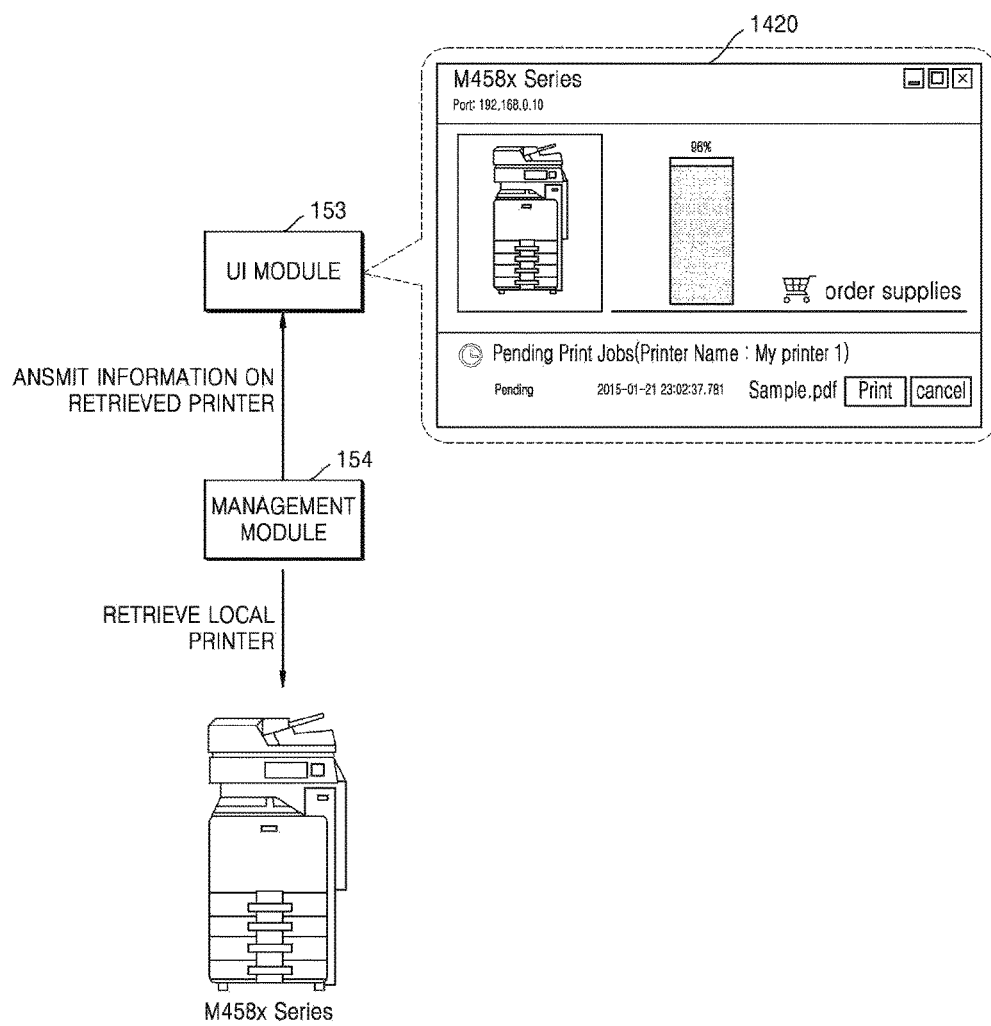

FIGS. 14A and 14B are diagrams illustrating a method of performing printing using a printer other than a local printer which is performing a print job when an error occurs in the local printer according to an embodiment. Processes shown in FIGS. 14A and 14B are performed after the device 100 requests a print job from the default printer 300.

Referring to FIG. 14A, the management module 154 requests status information from the default printer 300. When the print job is under way or has been successfully completed, the default printer 300 may transmit status information indicating the status to the management module 154. Then, the management module 154 displays the status information on the screen through the UI module 153. For example, when status information indicating that the print job has been successfully completed is received, a screen indicating completion of the print job is displayed.

When an error occurs during execution of the print job, the default printer 300 may transmit status information indicating occurrence of an error to the management module 154. FIG. 14A shows an example in which an error occurs in the default printer 300. In response to the status information request, the default printer 300 transmits content of the occurring error to the management module 154. The management module 154 transmits error information to the UI module 153, and at this time, a alternative option for correcting the corresponding error is also transmitted. Referring to a UI screen 1410 of FIG. 14A, the content "Door is open. Close it." of an error occurring in the default printer 300 is displayed in a region 1411. As a alternative option for correcting the error, "use other printers" 1412 is displayed. Also, in the UI screen 1410, "order supplies" 1413 and "troubleshooting" 1414 are displayed as options.

By selecting "use other printers" 1412, the user may retrieve a list of at least one local printer other than the default printer 300 to perform the print job. When there is a lack of toner, it is also possible to directly move to a website in which toner may be purchased by selecting "other supplies" 1413. Also, when the user wants to be guided through a solution, the user may select "troubleshooting" 1414.

In this way, the management module 154 may provide an additional function, such as a alternative option for an error, etc., together with status information of the default printer 300 through the UI module 153.

When the user selects "use other printers" 1412 in the UI screen 1410 of FIG. 14A, the process proceeds to FIG. 14B.

Referring to FIG. 14B, the management module 154 retrieves another local printer 310 to be used for the print job, and transmits information on the retrieved local printer 310 to the UI module 153. The UI module 153 receiving the information displays information on the currently pending print job and the information on the newly retrieved local printer 310 on a UI screen 1420. Also, the UI screen 1420 includes buttons ("print" and "cancel") for selecting whether or not to perform the print job through the newly retrieved local printer 310. When the user selects "print," the newly retrieved local printer 310 performs the pending print job.

FIG. 15 is a diagram illustrating a process in which a printer other than a default printer performs printing when an error occurs in the default printer according to an embodiment.

Referring to FIG. 15, the management module 154 requests a print job from the default printer 300 in operation 1501, and requests status information from the default printer 300 in operation 1502. In response to the request for status information, the default printer 300 notifies the management module 154 that an error has occurred in operation 1503.

When the management module 154 transmits error information to the UI module 153 in operation 1504, the UI module 153 displays an error notification screen in operation 1505. At this time, the UI module 153 may display not only content of the error but also a alternative option for the error on the screen. For example, the error notification screen may include a button for selecting the option "print with another printer."

When a selection of the option "print with another printer" is received in operation 1506, the UI module 153 transmits a printer retrieval request to the management module 154 in operation 1507. Accordingly, the management module 154 retrieves the local printer 310 other than the default printer 300 in operation 1508.

When the management module 154 transmits information on the retrieved local printer 310 to the UI module 153 in operation 1509, the UI module 153 displays a notification screen of the retrieved local printer 310 in operation 1510. At this time, the screen may include a button for selecting whether or not to perform the print job through the retrieved local printer 310.

When a print request through the local printer 310 is received in operation 1511, the UI module 153 transmits the print request to the management module 154 in operation 1512. Finally, the management module 154 requests the print job from the local printer 310 in operation 1513.

FIG. 16 is a diagram illustrating a process of providing a toner-purchasing option when a printer lacks toner according to an embodiment.

Referring to FIG. 16, the management module 154 requests a print job from the default printer 300 in operation 1601, and requests status information from the default printer 300 in operation 1602. In response to the request for status information, the default printer 300 notifies the management module 154 that an error has occurred in operation 1603.

When the management module 154 transmits error information to the UI module 153 in operation 1604, the UI module 153 displays an error notification screen in operation 1605. At this time, the UI module 153 may display not only content of the error but also a alternative option for the error on the screen. The error "lack of toner" occurs as shown in FIG. 16, and thus "purchase toner" may be provided as a alternative option for the error.

When a selection of the option "purchase toner" is received in operation 1606, the UI module 153 requests the communicator 110 to access a toner-purchasing webpage in operation 1607. Accordingly, the communicator 110 accesses the toner-purchasing webpage through the Internet, and then transmits information on the webpage to the UI module 153 in operation 1608. In operation 1609, the UI module 153 displays a screen of the toner-purchasing webpage, that is, a website in which it is possible to purchase toner, on the screen.

FIG. 17 is a diagram illustrating a process of providing a solution when an error occurs in a printer according to an embodiment.

Referring to FIG. 17, the management module 154 requests a print job from the default printer 300 in operation 1701, and requests status information from the default printer 300 in operation 1702. In response to the request for status information, the default printer 300 notifies the management module 154 that an error has occurred in operation 1703.

When the management module 154 transmits error information to the UI module 153 in operation 1704, the UI module 153 displays an error notification screen in operation 1705. At this time, the UI module 153 may display not only content of the error but also a alternative option for the error on the screen. For example, the option "troubleshooting" which guides the user through a solution to the error may be displayed on the screen.

When a selection of the option "troubleshooting" is received in operation 1706, the UI module 153 requests a solution from the communicator 110 in operation 1707. Here, a solution includes instructions for correcting the generated error. The communicator 110 acquires a solution through the Internet, and then transmits the solution to the UI module 153 in operation 1708. In operation 1709, the UI module 153 displays the received solution on the screen.

Figure 18:
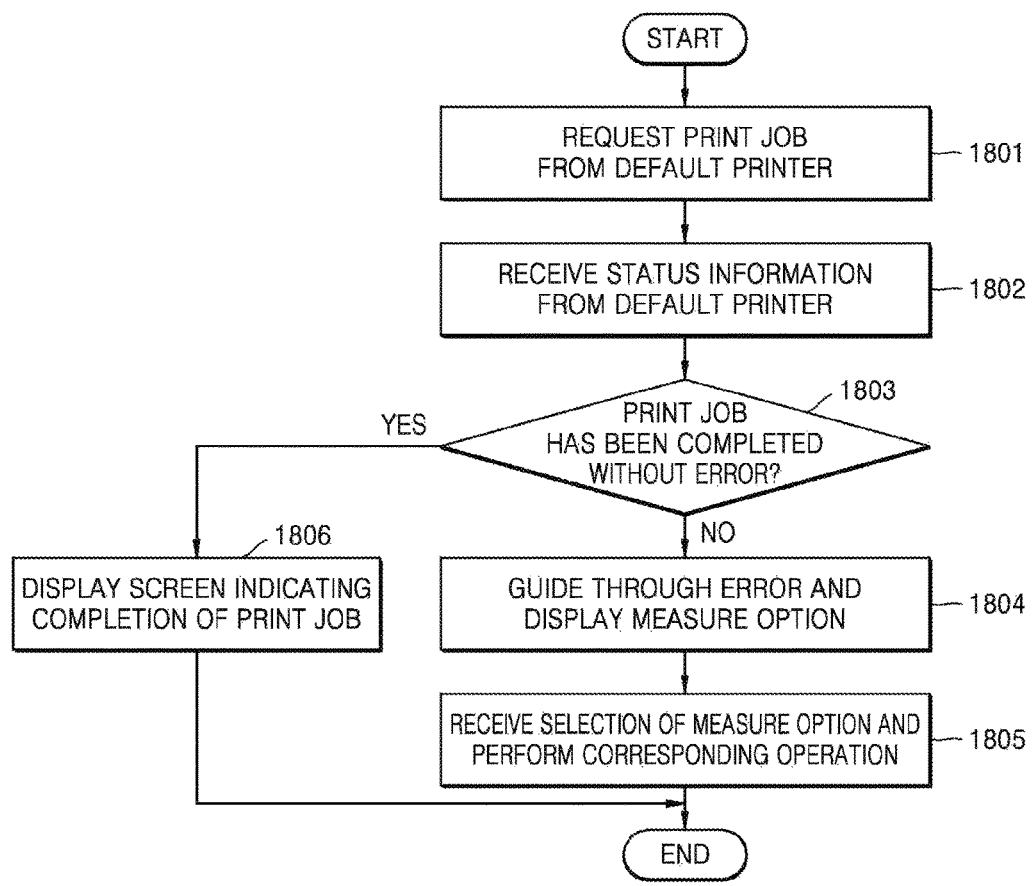
FIG. 18 is a flowchart illustrating a method of monitoring status information of a printer and providing a alternative option when an error occurs according to an embodiment.

FIG. 18 is a flowchart illustrating a method of monitoring status information of a printer and providing a alternative option when an error occurs according to an embodiment.

Referring to FIG. 18, in operation 1801, a device requests a print job from a default printer. In operation 1802, the device requests status information from the default printer and receives status information.

In operation 1803, the device determines whether or not the print job has been completed without an error based on the received status information. When it is determined that the print job has been completed without an error, the device displays a screen indicating completion of the print job in operation 1806. On the other hand, when it is determined that an error has occurred, the process proceeds to operation 1804, so that the device guides a user through content of the generated error and displays a screen including alternative options for the error.

In operation 1805, the device receives a selection from among the alternative options from the user, and performs an operation corresponding to the selected alternative option.

Meanwhile, when the device stores print data using a virtual printer, the device may perform the print job using a local printer even without being connected to the Internet. Such an embodiment will be described with reference to FIG. 19.

Figure 19:
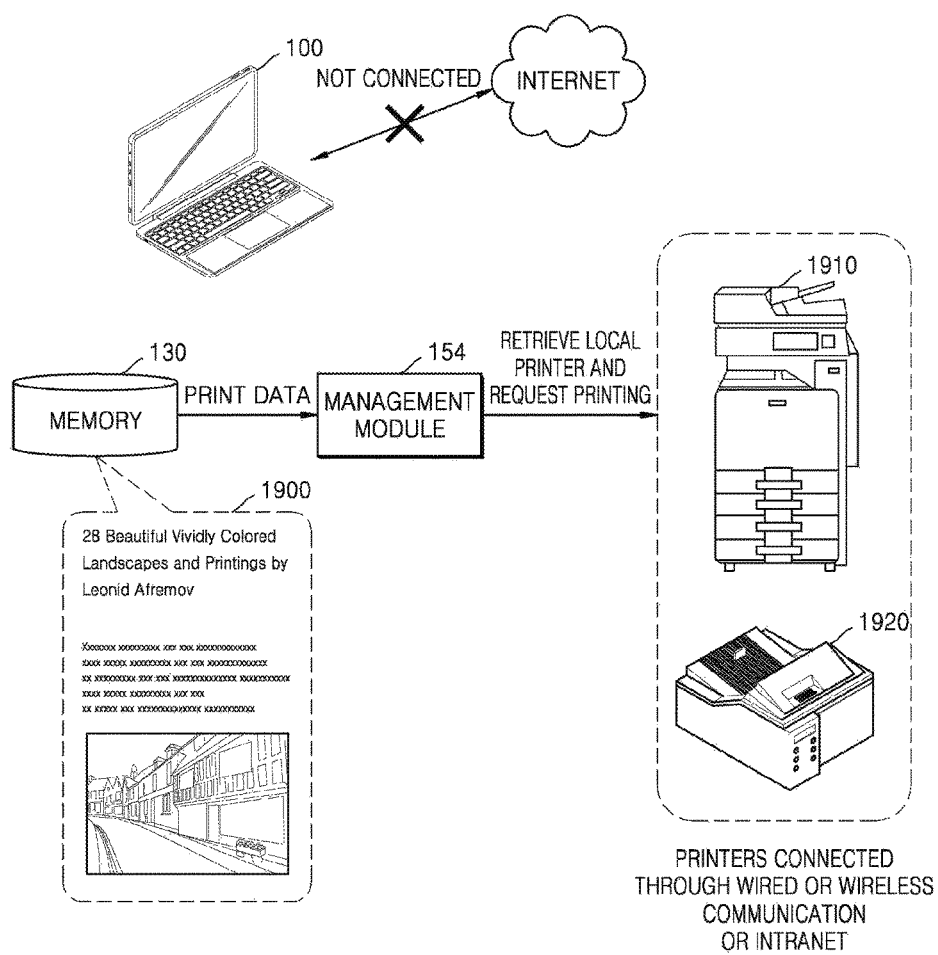
FIG. 19 is a diagram illustrating a method in which a device acquires print data through a virtual printer, stores the print data, and then performs printing using a local printer without being connected to the Internet according to an embodiment.

FIG. 19 is a diagram illustrating a method in which a device acquires print data through a virtual printer, stores the print data, and then performs printing using a local printer without being connected to the Internet according to an embodiment.

Referring to FIG. 19, the device 100 has acquired print data 1900 through a virtual printer and stored the print data 1900 in the memory 130. With regard to a detailed process of the device 100 acquiring the print data 1900 through a virtual printer, see FIGS. 8 to 13 described above.

In FIG. 19, the device 100 is not connected to the Internet, and it is not possible to use a cloud print service. However, to acquire print data through a virtual printer, the device 100 uses a cloud print service, and thus a connection to the Internet is prerequisite. Therefore, it is assumed that after the device 100 acquires the print data 1900 through a cloud print process employing a virtual printer while being connected to the Internet and stores the print data 1900 in the memory 130, the Internet connection of the device 100 is cut off.

Since the device 100 is not connected to the Internet, it is not possible to perform a print job through a cloud print service. However, since the print data 1900, which has been acquired in advance through the cloud print process employing a virtual printer while the device 100 has been connected to the Internet, remains in the memory 130, it is also possible to print the stored print data 1900 without going through the Internet.

The management module 154 of the device 100 may retrieve local printers 1910 and 1920 near the device 100, and request printing while transmitting the print data 1900 stored in the memory 130 to the retrieved printers 1910 and 1920. Here, the retrieved printers 1910 and 1920 are devices directly capable of wired or wireless communication with the device 100 or devices connected to the device 100 through an intranet, and thus are retrievable even when the Internet connection of the device 100 is cut off.

Figure 20:
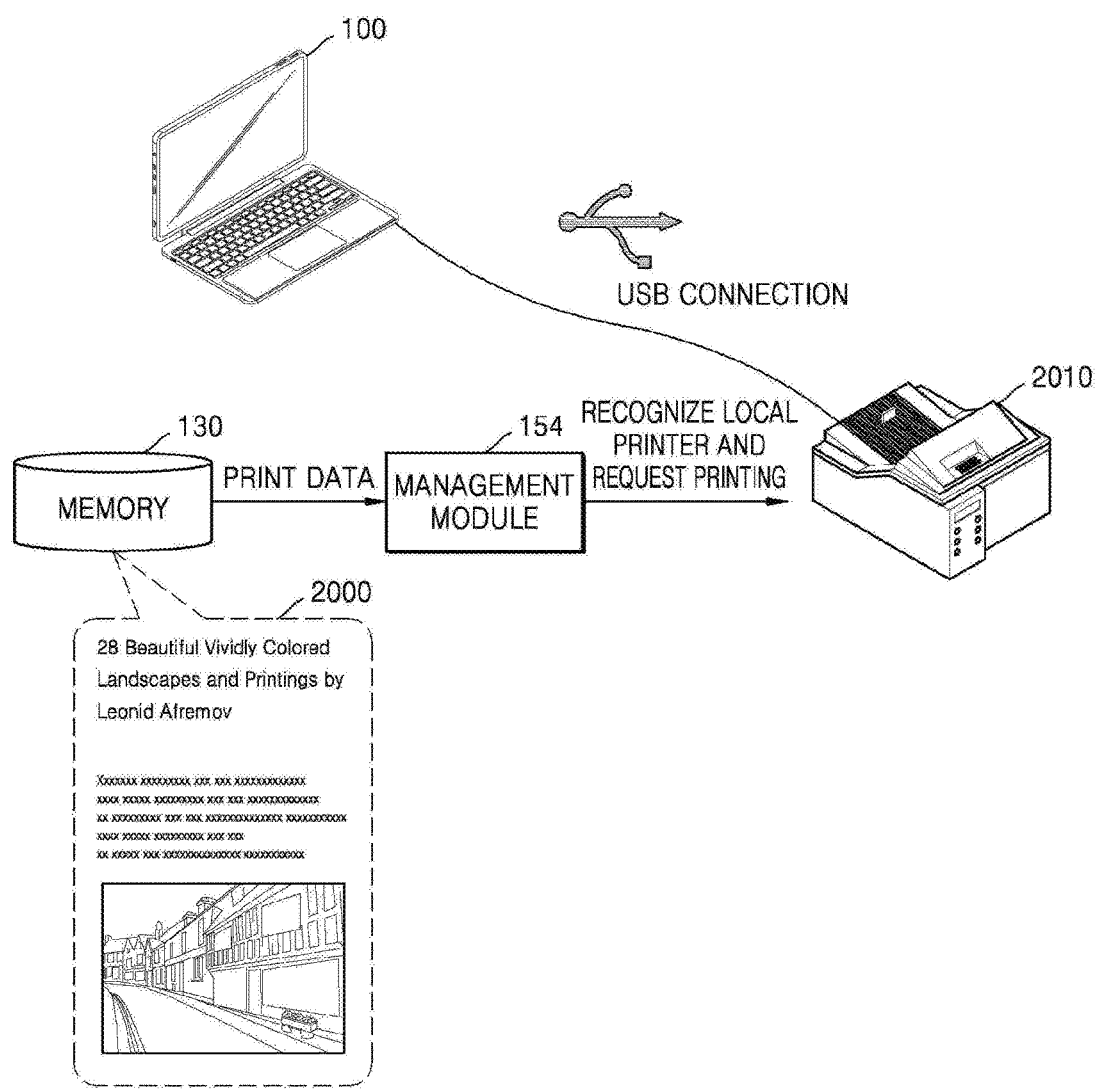
FIG. 20 is a diagram illustrating a method in which a device acquires print data through a virtual printer, stores the print data, and then performs printing using a local printer connected through a Universal Serial Bus (USB) according to an embodiment.

FIG. 20 is a diagram illustrating a method in which a device acquires print data through a virtual printer, stores the print data, and then performs printing using a local printer connected through a Universal Serial Bus (USB) according to an embodiment.

Referring to FIG. 20, the device 100 has acquired print data 2000 through a virtual printer and stored the print data 2000 in the memory 130. With regard to a detailed process of the device 100 acquiring the print data 2000 through a virtual printer, see FIGS. 8 to 13 described above.

The device 100 may be connected to a local printer 2010 through the USB. When the device 100 is connected to the local printer 2010 through the USB, the management module 154 may recognize the local printer 2010, and the UI module 153 may display information on the recognized local printer 2010 on the screen. When a request for a print job employing the recognized local printer 2010 is received from the user, the management module 154 may request printing while transmitting the print data 2000 stored in the memory 130 to the local printer 2010.

Meanwhile, the above-described embodiments of the present disclosure may be written as a computer-executable program, and may be implemented in a general-purpose digital computer which executes the program using computer-readable recording media. The computer-readable recording media include magnetic storage media, e.g., a ROM, a floppy disk, a hard disk, etc., optically readable media, e.g., a CD-ROM, a DVD, etc., and storage media, e.g., transmission over the Internet.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of performing a cloud print service using a virtual printer, the method comprising:
    by a client device including at least one memory storing computer-readable instructions and a processor executing the instructions,
        generating, by the processor, a virtual printer corresponding to a local printer, the local printer being connected to the client device;
        storing, in the memory, information regarding the generated virtual printer;
        registering the generated virtual printer with a server which provides the cloud printing service;
        receiving a printing request of a content file with the registered virtual printer designated as an output printer;
        transmitting, by the processor, the content file to the server when the printing request is received, the transmitted content file being converted to print data by the server;
        determining, by the processor, whether the print data has been received by the registered virtual printer;
        when it is determined that the print data has been received by the registered virtual printer from the server, acquiring, by the processor, the received print data from the registered virtual printer; and
        controlling, by the processor, printing of the acquired print data by the local printer by transmitting the acquired print data to the local printer.

2. The method of claim 1, wherein the controlling of printing comprises:
    checking print options prestored in the client device; and
    controlling the printing according to the checked print options.

3. The method of claim 1, wherein the local printer is a default printer corresponding to the virtual printer.

4. The method of claim 1, wherein the acquiring of the print data comprises:
    receiving a notification of a print job generation event from the server;
    requesting the print data from the server; and
    receiving the print data from the server.

5. The method of claim 1, wherein the registering of virtual printer comprises:
- receiving a name of the virtual printer;
- retrieving a list of at least one local printer including the local printer;
- receiving a selection of a default printer corresponding to the virtual printer from the list of at least one local printer;
- requesting registration of the virtual printer while transmitting the name of the virtual printer to the server; and
- storing the name of the virtual printer and information on the default printer in response to receiving a registration completion response from the server.

6. The method of claim 1, further comprising:
- receiving status information from the local printer; and
- displaying the status information on a display of the client device.

7. The method of claim 6, wherein the displaying of the status information on the display comprises:
- analyzing the status information to determine whether an error has occurred in the local printer; and
- displaying error information and at least one measure option on the display, when the determining indicates the error has occurred in the local printer.

8. The method of claim 7, further comprising:
- receiving a selection of any one of the at least one measure option; and
- performing an operation according to the selected measure option.

9. The method of claim 8, wherein, when the selected measure option is printing using another printer other than the local printer in which the error has occurred, the performing of the operation according to the selected measure option comprises:
- retrieving the another printer; and
- transmitting the print request to the another printer while transmitting the print data to the another printer.

10. A non-transitory computer-readable recording medium storing a program for causing a computer to perform the method of claim 1.

11. A client device which performs a cloud print service using a virtual printer and a server which provides the cloud print service, the client device comprising:
- a display;
- a user interface (UI) configured to display on the display of the client device and receive an input from a user;
- a communicator configured to communicate with a server which provides the cloud print service;
- a memory configured to store data; and
- a controller configured to
  - generate a virtual printer corresponding to a local printer, the local printer being connected to the client device,
  - when a printing request of a content file with the virtual printer designated as an output printer is received through the UI, control the communicator to transmit the content file to the server, the transmitted content file being converted to print data by the server,
  - determine whether the print data has been received by the virtual printer from the server,
  - when the controller determines that the print data has been received by virtual printer from the server, control the communicator to acquire the received print data from the virtual printer, and
  - control printing of the acquired print data by the local printer by transmitting the acquired print data to the local printer.

12. The client device of claim 11, wherein the controller checks print options prestored in the memory, and controls the printing according to the checked print options.

13. The client device of claim 11, wherein the controller requests the printing from a default printer corresponding to the virtual printer while transmitting the print data to the default printer with reference to the memory.

14. The client device of claim 11, wherein, the controller requests the print data from the server and receives the print data from the server in response to receiving of a notification of a print job generation event from the server.

15. The client device of claim 11, wherein, when a name of the virtual printer and a selection of a default printer corresponding to the virtual printer are received through the UI, the controller requests registration of the virtual printer while transmitting the name of the virtual printer to the server, and
- the controller stores the name of the virtual printer and information on the default printer in the memory in response to receiving a registration completion response from the server.

16. The client device of claim 11, wherein the controller requests and receives status information from the local printer, and displays the received status information on the display through the UI.

17. The client device of claim 16, wherein the controller analyzes the status information to determine whether an error has occurred in the local printer, and displays error information and at least one measure option on the display through the UI when an error has occurred.

18. The client device of claim 17, wherein, when any one of the at least one measure option is selected, the controller performs an operation according to the selected measure option.

19. The client device of claim 18, wherein, when the selected measure option is printing using another printer other than the local printer in which the error has occurred, the controller retrieves the another printer, and transmits the print request of the print data while transmitting the print data to the another printer.

* * * * *